C. O. WOLD.
CULVERT PIPE.
APPLICATION FILED JAN. 3, 1910.
970,772.
Patented Sept. 20, 1910.
2 SHEETS—SHEET 1.
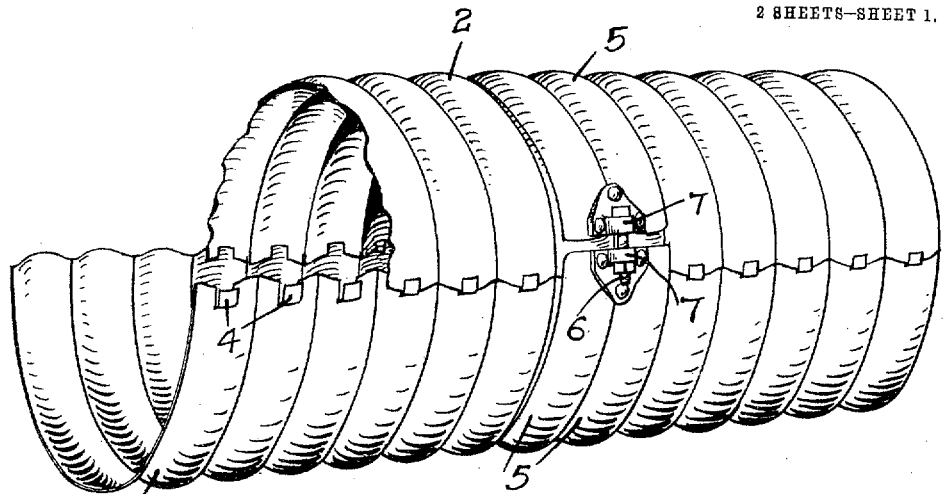
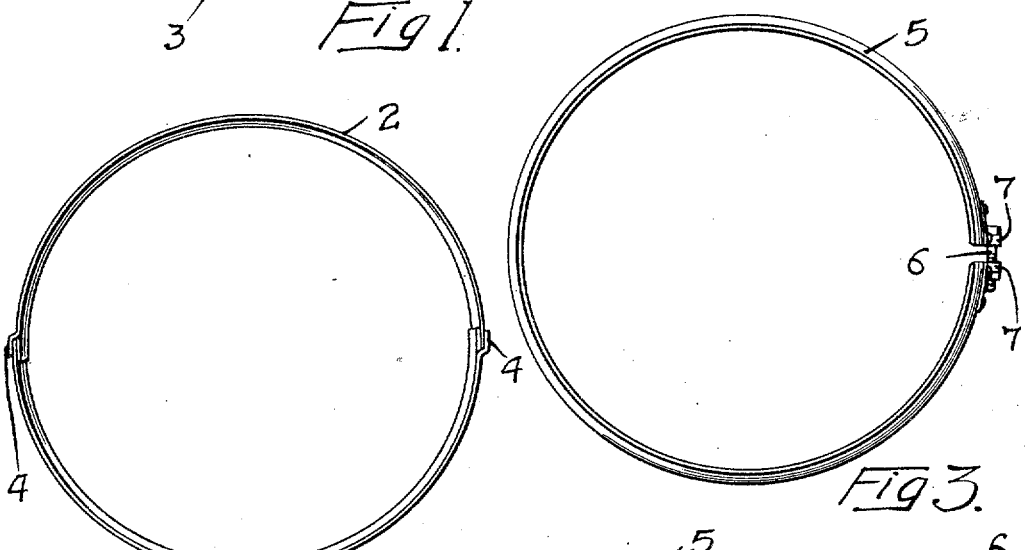
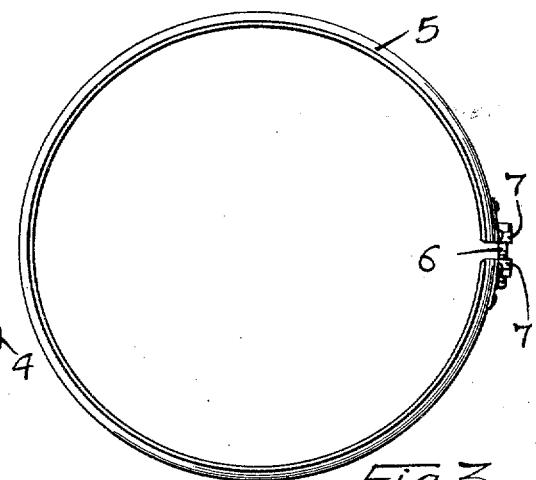
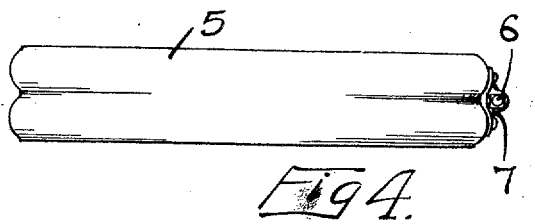
WITNESSES
A M Walstrom
J A Byington
INVENTOR
CARL O. WOLD
BY Paul & Paul
ATTORNEYS
THE NORRIS PETERS CO., WASHINGTON, D. C.

C. O. WOLD.
CULVERT PIPE.
APPLICATION FILED JAN. 3, 1910.
970,772. Patented Sept. 20, 1910.
2 SHEETS—SHEET 2.
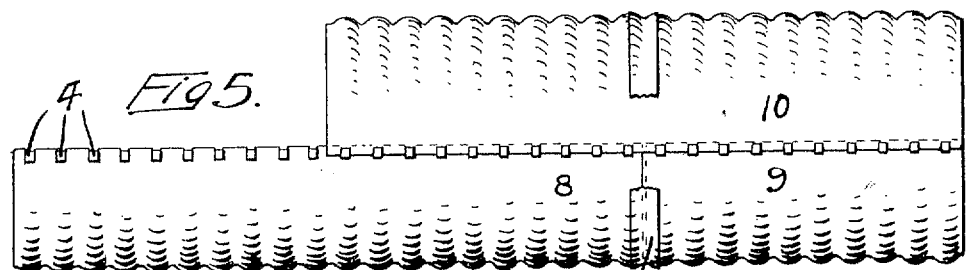
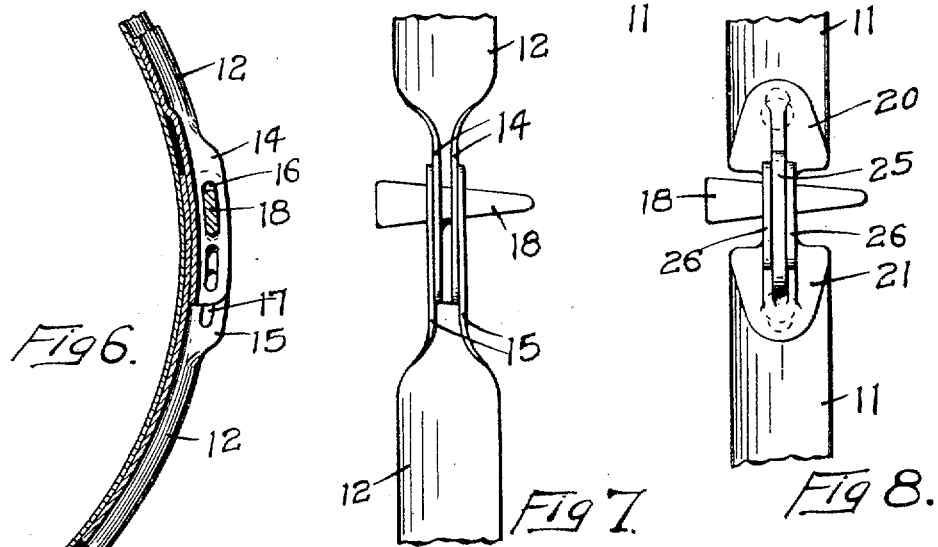
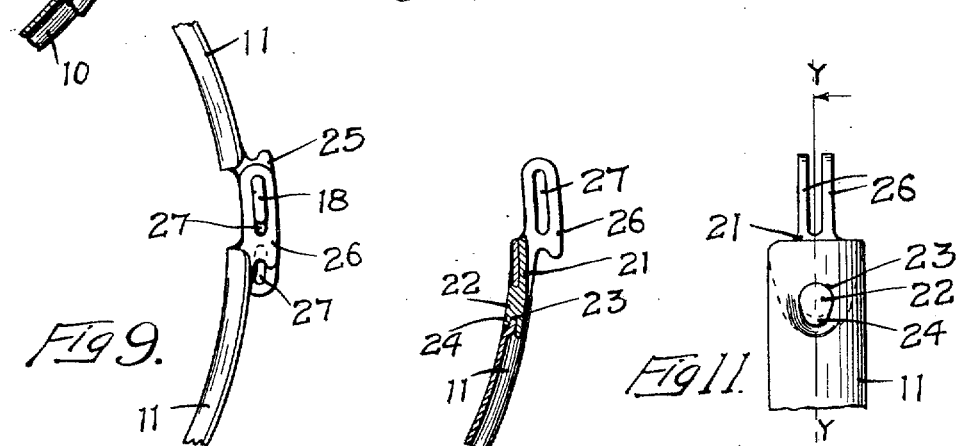
WITNESSES
INVENTOR
CARL O. WOLD
BY Paul & Paul
ATTORNEYS

UNITED STATES PATENT OFFICE.

CARL O. WOLD, OF MINNEAPOLIS, MINNESOTA, ASSIGNOR OF ONE-HALF TO EVEN E. ELLERTSON, OF MINNEAPOLIS, MINNESOTA.

CULVERT-PIPE.

970,772.

Specification of Letters Patent. Patented Sept. 20, 1910.

Application filed January 3, 1910. Serial No. 536,195.

*To all whom it may concern:*

Be it known that I, CARL O. WOLD, of Minneapolis, Hennepin county, Minnesota, have invented certain new and useful Improvements in Culvert-Pipes, of which the following is a specification.

The object of my invention is to provide a culvert pipe of simple, economical construction and one which can be shipped in knock-down form from the place of manufacture to the work.

A further object is to provide a culvert pipe which can be easily and quickly set up without the use of special tools.

The invention consists generally in various constructions and combinations, all as hereinafter described and particularly pointed out in the claims.

In the accompanying drawings forming part of this specification, Figure 1 is a perspective view of a culvert pipe embodying my invention, Fig. 2 is an end view of one of the pipes, Fig. 3 is an edge view of the joint encircling band, Fig. 4 is a top view of the band, Fig. 5 is a side view of the pipe showing the manner of breaking joints by varying the length of the semi-cylindrical sections, Fig. 6 is a detail view, partially in section, illustrating a means for securing the ends of the band together, Fig. 7 is a front view of the same, Fig. 8 is a similar view of a modified construction, Fig. 9 is an edge view of the device shown in Fig. 8, Fig. 10 is a sectional view on the line $y$—$y$ of Fig. 11, Fig. 11 illustrates the means for attaching the clamping device of Fig. 8 to the end of the band.

In the drawing, 2 and 3 represent semi-cylindrical sections of the culvert or other pipe having transverse corrugations therein which extend around the pipe when the sections are placed together. The corresponding edges of these semi-cylindrical sections have a series of lugs 4 pressed or punched therefrom, either outwardly or inwardly, as may be preferred, and these lugs form a series of seats to receive the plain longitudinal edges of the other section.

As indicated plainly in Fig. 2, I prefer to provide the lugs on one edge of each section, the other edges being smooth or plain, and the two sections will thus be alike and when placed in the position shown in Fig. 2, their edges will interlock and be held in coöperating relation with one another to form the pipe. Of course, if preferred, the lugs may be provided on both edges of one section, leaving the edges of the other section plain, but the construction shown is the one I prefer to adopt. The sections, when separated, can be nested or placed one within the other for convenience in transportation and handling.

A band 5, of sufficient width, preferably, with two annular corrugations formed therein, is provided at the transverse joint between the sections of the pipe and fitting the end corrugations thereof holds the said ends together, said band being clamped on the sections by means of a bolt 6 passed through ears 7 mounted on the ends of the band. By turning up this bolt the band may be clamped firmly on the pipe sections to hold them securely against longitudinal movement, as indicated in Fig. 1.

In Fig. 5 I have illustrated a construction of pipe in which sections 8 and 9, having abutting ends, are used with a longer section 10 that is arranged to break joints with the sections 8 and 9. The edges of the semi-cylindrical sections are interlocked in the manner heretofore described, but a narrower band 11 may be used, having only one corrugation therein and adapted to fit the concave between the corrugations of the sections and cover the joint.

Various means may be devised for drawing the ends of this band together. I have illustrated one form, however, which is very effective and comparatively inexpensive. As shown in Figs. 6 and 7, the ends of the band 12 are provided with flanges 14 and 15, adapted to fit one within the other, and having longitudinal slots 16 and 17 of different length, so that when the ends are brought together the slots in the flanges of one end will lap by the corresponding slots in the flanges of the other end, as indicated in Fig. 6. A key 18 fits these slots extending transversely of the band. This key is wedge-shaped, and when the pointed end is inserted into the slots and the key driven therein, the ends of the band will be drawn together until the slots are in complete register with one another and by providing two slots, I am able to drive in one key and draw up the band a certain distance and then insert a second key into the other slots and complete the clamping operation, the first key becoming loose as soon as the second one is driven into its slots.

In Fig. 8 castings 20 and 21 are provided. These castings have studs 22 thereon adapted to fit into holes 23 in the ends of the band, said studs having lips 24 which engage the edges of the holes in the band and prevent the studs from accidentally slipping out of the holes. Ears 25 and 26 are formed on the castings, the ear 25 slipping between the ears 26 and a longitudinal slot 27 being formed in each ear to receive the tapered wedge. By this means the ends of the band are drawn snugly around the pipe sections, clamping them securely together.

The pipe may be made of any suitable weight of metal, corrugated or not, as preferred, and can be shipped in nested knockdown form from the factory to the work and easily and quickly assembled and set up. Various other means may be devised for clamping the band around the pipe. I do not, therefore, wish to be confined to the particular means herein shown and described.

I have shown the lugs pressed outwardly from the edges of the sections, but they may be pressed inwardly, if preferred, and arranged at any suitable distance apart, according to the size of the pipe and the weight of the metal.

I claim as my invention:

1. A conveyer pipe composed of sections placed end to end, a band inclosing the joint between said sections, the ends of said band having parts lapping by one another and provided with longitudinal slots, and a key fitting into said slots and movable transversely with respect to said band to draw the ends thereof together and clamp the joint between said sections, substantially as described.

2. A conveyer pipe composed of semi-cylindrical sections having circumferential corrugations formed therein, and a series of lugs provided on the edge of one section, said lugs forming a seat for the plain, smooth edge of the other section, and means for locking said sections together.

3. A conveyer pipe composed of sections adapted to be placed end to end, a band encircling the joint between said ends, lugs secured to said band and having slots therein, and a key adapted to enter said slots and movable therein transversely with respect to said band.

4. A conveyer pipe composed of sections placed end to end, a band inclosing the joint between said sections, the ends of said band having parts lapping by one another and provided with longitudinal slots, the slots in one end being longer than the slots in the other end of the band, and a key fitting said slots and movable transversely therein to draw the ends of the band together.

5. A conveyer pipe composed of sections adapted to be placed end to end, a band inclosing the joint between said sections, ears having studs formed thereon and fitting within holes in the ends of said band, said ears having longitudinal slots and a key fitting transversely in said slots.

6. A conveyer pipe composed of semi-cylindrical sections, one of said sections having lugs formed on its longitudinal edge to receive the corresponding plain edge of the other section, the opposing sections being of different length whereby the joint will be broken between the sections, and a band encircling said joint and binding the sections together.

7. A conveyer pipe composed of sections adapted to be placed end to end, a band inclosing the joint between said sections, ears having studs formed thereon fitting within holes in the ends of said band, and means for drawing said ears together to clamp said band around the joint.

8. A conveyer pipe composed of semi-cylindrical sections, each section having a series of lugs pressed or punched outwardly from the longitudinal edges thereof, a space being formed between said lugs and the edge of each section, the smooth edge of each section being adapted to enter the space between the lugs and the opposing edge of the other section, and said lugs forming seats with which the edge of the opposite section contacts when the sections are arranged in cylindrical form, and means encircling the sections and securing them against longitudinal movement, said sections being freely separable when said securing means is removed.

In witness whereof, I have hereunto set my hand this 28th day of December 1909.

CARL O. WOLD.

Witnesses:
L. C. CRONEN,
J. A. BYINGTON.